(12) United States Patent
Lynch et al.

(10) Patent No.: US 9,175,522 B2
(45) Date of Patent: Nov. 3, 2015

(54) CONNECTOR ARRANGEMENT FOR A SUBSEA PIPELINE

(75) Inventors: Brian Lynch, Aberdeen (GB); Dominique-Louis Delaporte, Lons (FR); Henri Marie Louis Romazzotti, Arbus (FR); Eric Marc Alain Meyer, La Rochelle (FR)

(73) Assignees: TECHNIP FRANCE (FR); TOTAL S.A. (FR)

( * ) Notice: Subject to any disclaimer, the term of this patent is extended or adjusted under 35 U.S.C. 154(b) by 0 days.

(21) Appl. No.: 14/240,436

(22) PCT Filed: Sep. 3, 2012

(86) PCT No.: PCT/GB2012/052156
§ 371 (c)(1),
(2), (4) Date: Apr. 29, 2014

(87) PCT Pub. No.: WO2013/030599
PCT Pub. Date: Mar. 7, 2013

(65) Prior Publication Data
US 2014/0241810 A1 Aug. 28, 2014

(30) Foreign Application Priority Data
Sep. 2, 2011 (GB) .................................. 1115163.6

(51) Int. Cl.
*F16L 1/12* (2006.01)
*E21B 17/02* (2006.01)
(Continued)

(52) U.S. Cl.
CPC . *E21B 17/02* (2013.01); *F16L 1/26* (2013.01); *F16L 25/01* (2013.01); *F16L 39/005* (2013.01); *F16L 53/008* (2013.01); *H01R 13/005* (2013.01); *H01R 13/523* (2013.01)

(58) Field of Classification Search
CPC ........................................................ E21B 36/04
USPC ................ 405/169, 170, 183.5; 138/114, 109
See application file for complete search history.

(56) References Cited

U.S. PATENT DOCUMENTS 4,490,073 A * 12/1984 Lawson ........................ 405/169
6,315,497 B1 11/2001 Wittman et al.
(Continued)

FOREIGN PATENT DOCUMENTS

GB 2 388 641 A 11/2003
GB 2 416 016 11/2006
(Continued)

OTHER PUBLICATIONS

International Search Report dated Oct. 23, 2012 issued in corresponding International patent application No. PCT/GB2012/052156.
(Continued)

*Primary Examiner* — Sean Andrish
(74) *Attorney, Agent, or Firm* — Ostrolenk Faber LLP

(57) ABSTRACT

A barrier connector arrangement (20) for a multi-pipe pipeline (14) for use in a subsea environment, the pipeline (14) comprising at least one inner pipe (12) and an outer pipe (11) having a dry annulus (13) thereinbetween, and one or more cables (50, 51) extending along the annulus (13), the connector arrangement (20) comprising: an outer housing (21) configured to be joined to the outer pipe (11) to define a dry interior housing with the annulus (13); and one or more dry barrier chambers (26, 27) extending through and welded to the housing (21) for connecting one or more of the cables (50, 51) in the pipeline (14) with one or more external cables in the subsea environment.

19 Claims, 10 Drawing Sheets

(51) Int. Cl.
*F16L 1/26* (2006.01)
*F16L 39/00* (2006.01)
*F16L 25/01* (2006.01)
*F16L 53/00* (2006.01)
*H01R 13/523* (2006.01)
*H01R 13/00* (2006.01)

(56) References Cited

U.S. PATENT DOCUMENTS

| | | | |
|---|---|---|---|
| 6,371,693 B1 | 4/2002 | Kopp et al. | |
| 6,739,803 B2 | 5/2004 | Bass et al. | |
| 7,033,113 B2 | 4/2006 | March | |
| 8,430,168 B2 * | 4/2013 | Goodall et al. | 166/336 |

FOREIGN PATENT DOCUMENTS

| | | |
|---|---|---|
| GB | 2 416 016 A | 11/2006 |
| GB | 2 416 016 B | 11/2006 |
| GB | 2 460 170 | 11/2009 |
| WO | WO 2004/102059 A1 | 11/2004 |
| WO | WO 2007/096760 A1 | 8/2007 |
| WO | WO 2008/135780 A1 | 11/2008 |
| WO | WO 2009/002187 A1 | 12/2008 |
| WO | WO 2010/019046 A1 | 2/2010 |
| WO | WO 2010/019290 A1 | 2/2010 |

OTHER PUBLICATIONS

International Preliminary Report on Patentability dated Mar. 4, 2014 issued in corresponding International Application No. PCT/GB2012/052156.

Search Report dated Dec. 19, 2011 issued in corresponding United Kingdom Patent Application No. GB1115163.6 (now United Kingdom Patent No. GB 2494180 A/B).

Noureddine Laouir, et al., "Heated PIP: Combining Passive Insulation and Active Heating for Enhanced Thermal Performance," OMAE01-4014, 20th International Conference on Offshore Mechanics and Arctic Engineering—OMAE 2001, Rio de Janeiro, RJ Brazil, Jun. 3-8, 2001, pp. 1-8.

* cited by examiner

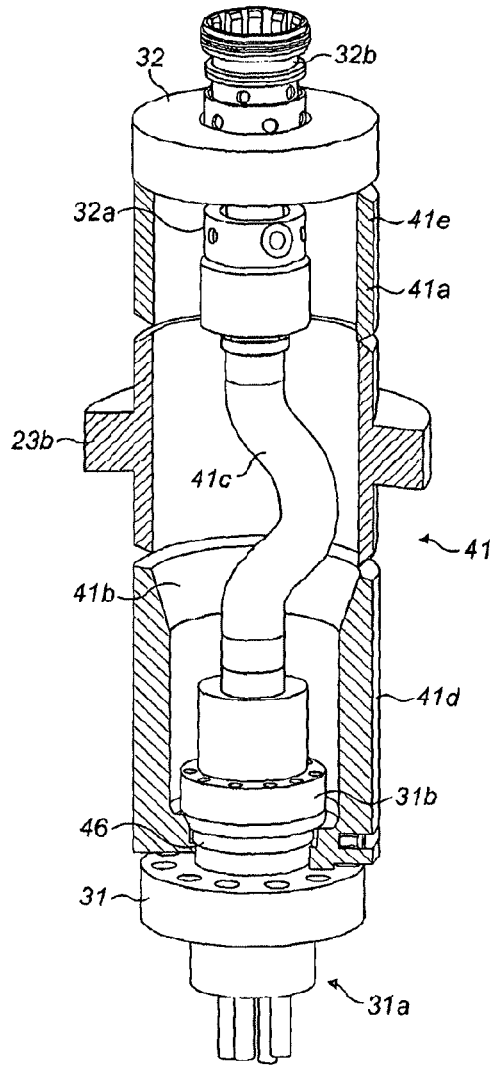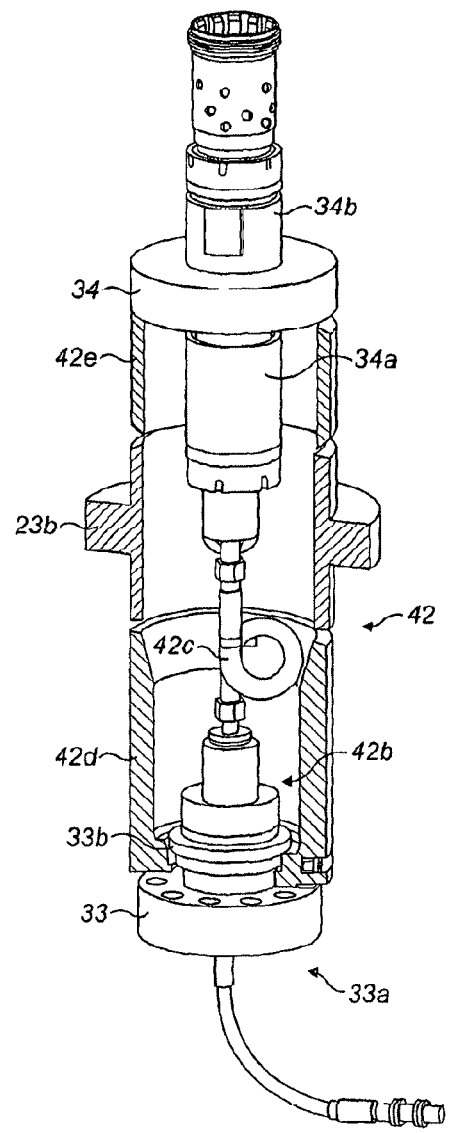
FIG. 6a
FIG. 7a

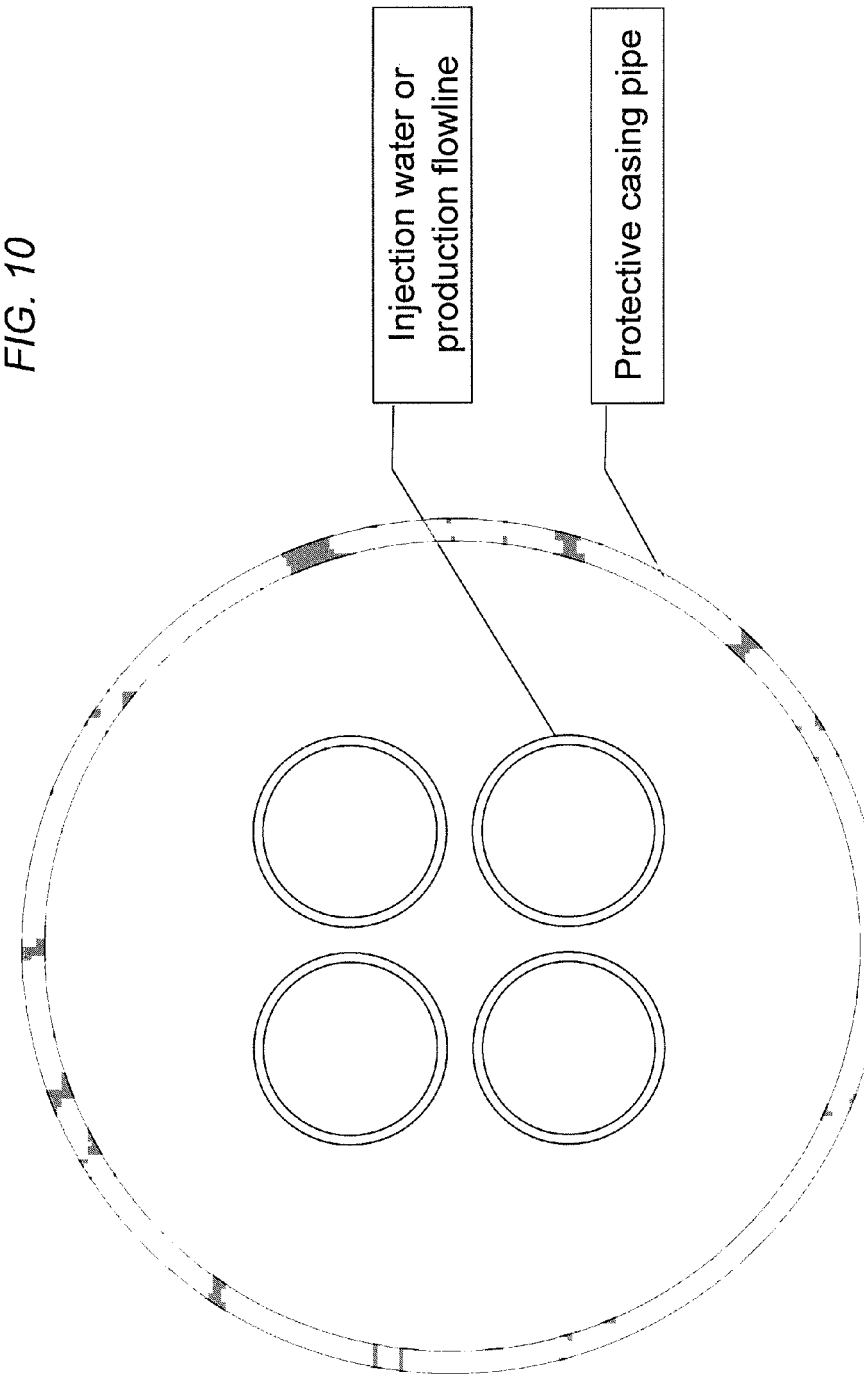

CONNECTOR ARRANGEMENT FOR A SUBSEA PIPELINE

CROSS REFERENCE TO RELATED APPLICATIONS

The present application is a 35 U.S.C. §371 National Phase conversion of PCT/GB2012/052156, filed Sep. 3, 2012, claiming the benefit of United Kingdom Application no. 1115163.6, filed Sep. 2, 2011, the disclosure of which is incorporated herein by reference. The PCT International Application was published in the English language.

TECHNICAL FIELD OF THE INVENTION

The present invention relates to a connector arrangement for a multi-pipe pipeline, such as a pipe-in-pipe (PIP) pipeline or a bundle subsea pipeline, and in particular to a barrier connector arrangement for connecting cables in an annulus between inner and outer pipes to an external assembly, such as for example a supply or control unit.

BACKGROUND OF THE INVENTION

Pipe-in-pipe pipelines, also known as PIP pipelines, are well known in the art, and generally comprise, with reference to the accompanying prior art FIG. 1, an outer pipe 1 (or "carrier pipe") and a usually concentric or co-axial inner pipe or flowline 2. An annular space or "dry annulus" is defined between the inner and outer pipes. The inner pipe 2 is used to transport or convey fluids such as hydrocarbons, in particular oil and gas, between two or more static and/or moveable locations. This includes conveying fluids between vessels, or locations at or near a seabed such as an oil head, in particular a remote oil head, to an underwater facility and/or to a riser towards sea level, and/or directly to an onshore facility.

Bundle pipelines are also well known in the art and generally comprise an outer pipe (or "casing pipe") and a combination of inner pipes, with annular space thereinbetween. The inner pipelines may comprise at least one flowline used to transport or convey fluids such as hydrocarbons, in particular oil and gas, between two or more static and/or moveable locations. Other inner pipes can be used for, but are not limited to, water injection, gas lift and chemical injection. Umbilical cables can also be included in a bundle pipeline.

It is possible to insert cables in the dry annulus created between such various inner and outer pipes. Umbilical cables are well known to be inserted with a bundle pipeline system, for example for control and electrical feeding of remote structures. Monitoring cables such as, but not limited to, optical fibres can also be placed in the annular space between the inner and outer pipes to provide monitoring of one or more parameters such as for example temperature, pressure or deformations.

Moreover, fluids circulating along deepwater or long tie-back flowlines may experience a significant temperature drop, leading to the risk of hydrate plugging and wax formation, especially in oil and gas flows. PIP and bundle pipelines can address the problem of hydrate or wax plugging without having to access the interior of the inner flowline. Active heating is typically implemented by a method known as 'trace heating', whereby electrical cables, which may be round or flat cables, are placed in the annular space between the inner and outer pipes to provide heat for maintaining the required temperature level of the fluid inside the inner pipe. A PIP pipeline with a trace heating arrangement is also known as a ETH-PIP pipeline (electrically trace heated pipe-in-pipe).

For the purpose of the present description, the term cables includes all types of elongate cables designed to run co-axially within a pipeline, being separate or attached with one or more inner pipes, and including but not limited to umbilical, optical, trace heating or electrical cables.

Cables in the annular space of a pipeline require a connection to a power or control supply. Typically, a subsea feeding system is arranged alongside the pipeline, including feed umbilical connectors and optionally a subsea transformer for electrical power system. The feeding system is usually connected to a topside control unit, and for power application, to an electrical power production facility.

The cables in the pipeline are typically connected to the feeding system at an end region of the cabled pipeline, also termed a pipeline end termination (PLET), via a connector arrangement, which can form an integral part of PLET and acts as the gateway between the pipeline cable system and the external power or control unit. The connector arrangement can also form an integral part of an in-line tee or in-line tee assembly (ILT/ITA) characteristically placed at mid-line pipeline location.

The purpose of the connector arrangement is to make the connection between the cables and a subsea umbilical termination arrangement (SUTA) of the subsea feeding umbilical, while maintaining a leak-proof barrier between the hydrostatic wet subsea environment and the dry annulus of the pipeline at atmospheric pressure. Preservation of the 'leak-proof-ness' of the dry annulus is of utmost importance in this arrangement as the main disadvantages associated with connector junctions include low levels of redundancies associated with leak prevention.

Hitherto, elastomeric seals are typically used for sealing the connections between the dry annulus and the wet environment in conventional connector arrangements such as that shown in GB2416016A. However, the performance of such seals in the long term has been questioned.

GB2416016B describes a mid-line connector for pipe-in-pipe electrical heating, based on outer body and inner body forgings brought together to form a single 'connector', having a single dry interior area, and having pre-formed connection pockets with elastomeric seals. As well as only using elastomer seals, the forgings are also not easily changeable for other configurations, and the connector must be inserted between two inner and outer pipes of a PIP pipeline only having an electrical current-based heating system.

It is an object of the present invention to provide an improved connector arrangement for connecting cables (preferentially electrical or optical cables) in an annular space between inner and outer pipes of a pipeline to an external assembly, such as for example a power supply, monitoring unit or control unit.

SUMMARY OF THE INVENTION

Accordingly, the present invention provides a connector arrangement for a barrier connector arrangement for a multi-pipe pipeline for use in a subsea environment, the pipeline comprising at least one inner pipe and an outer pipe having a dry annulus thereinbetween, and one or more cables extending along the annulus, the connector arrangement comprising:

an outer housing configured to be joined to the outer pipe to define a dry interior housing with the annulus; and one or more dry barrier chambers extending through the housing for connecting one or more of the cables in the pipeline with one or more external cables in the subsea environment.

In this way, the welding of the dry barrier chamber(s) between the subsea environment and the dry annulus in the pipeline increases the integrity, reliability or 'leakproof-ness' of the connector arrangement. This ensures a robust and reliable primary leak path mitigation.

Optionally, each dry barrier chamber includes one or more elastomeric seals therewithin. The connector's internal elastomeric seals could be used for secondary leak path to prevent a leak path through the connector itself, and constitute a 'dual barrier' effect to prevent any water ingress from the sea.

In addition, the conductor arrangement of the present invention also provides two dry areas, a dry interior housing area and a dry chamber. Generally, the dry barrier chamber(s) form the main 'barrier' or 'transition' between the subsea or wet environment, and the dry interior housing.

Optionally, the cable(s) comprise at least one of the group comprising: electrical, trace heating optical or umbilical cable, or combinations of same, extending in parallel with at least one the inner pipe of the pipeline, in particular along the inside of a production inner pipe such as the pipeline (1) shown in FIG. 1. FIG. 1 shows an example of an optical cable 5 and a number of electrical cables 6 extending in a S-Z manner along the inner pipe 2 for a PIP pipeline, and the skilled man will be aware of similar and other possible arrangements of such cables either for an ETH-PIP pipeline, an EH-PIP pipeline, or other such pipelines.

Preferably, the pipeline has cables comprising at least one, electrical, trace heating optical or umbilical cable, and the connector arrangement comprises at least one dry housing barrier and one welded dry barrier chamber. More preferably, there is a dedicated dry barrier chamber for each cable extending within the pipeline.

The dry annulus of the pipeline may be wholly or substantially an annular space such as in many or most PIP pipelines, or wholly or substantially filled with one or more materials, such as insulation of fixing materials, or a combination of same.

In one embodiment, the pipeline is a PIP pipeline having an annular space as the annulus between inner and outer pipes, and the cable(s) comprise at least one PIP cable.

In another embodiment, the pipeline is a bundle pipeline having a casing pipe as the outer pipe and a combination of inner pipes comprising at least one fluid flowline.

Optionally, all the welded dry barrier chambers are wholly or substantially parallel with the pipeline. Such an arrangement provides a convenient configuration for the dry barrier chambers in use, to minimize possible damage during pipelay installation and use, in particular during connection with subsea cables, as well as providing a more convenient method of manufacturing the connector arrangement as discussed hereinbelow, more especially in a modular form able to easily adapt to accommodating different numbers of dry barrier chambers for different pipelines.

Alternatively or additionally, all the welded dry barrier chambers are wholly or substantially perpendicular with the pipeline.

The present invention may also include the provision of a safety cage or frame that may be provided around the connector arrangement, especially to assist with the handling and/or safety of the connection arrangement, particular during installation and use.

The connector arrangement of the present invention can provide a dry interior housing which is configured to maintain atmospheric pressure therein, or maintain a reduced pressure, therein, alternatively with a pressure compensation system or a vacuum. It is an advantage of the present invention to have such a pressure in the dry interior housing which allows the usage of simple and easy leads between the dry barrier chambers and the cables, without requiring any significant adaptation of the dry interior housing during manufacture.

As the dry barrier chamber(s) extend through the housing of the connector arrangement, such chambers usually have one end in the subsea environment, as a subsea environment end, and one end in the housing, as a dry interior housing end.

Preferably, the or each dry barrier chamber comprises two mateable penetrators, one at each dry interior housing end (thus being an 'internal penetrator'), and one at each subsea environment end. The mateable penetrators may be dry or wet, with at least the subsea environment end mateable penetrator being of the wet type.

Penetrators provide a suitable portal through the ends of the dry barrier chamber(s), which can either allow for direct connection to leads and connectors therefrom, or which can provide the housing for the connection with such leads or connectors.

Such penetrators can include those specifically designed or adapted to be power connectors or optical connectors. Such penetrators are well known in the art.

According to another embodiment of the present invention, the or each dry barrier chamber may comprise a dry mateable penetrator at each dry interior housing end (as the internal penetrator). That is, through the end of dry barrier chamber within the housing. Cable leads (cold electrical lead or optical leads for example) can be used for connection between each dry mateable penetrator and each cable The or each dry mateable penetrator provides a convenient interface between the dry barrier chamber and the dry interior housing at this 'intermediate' level between the subsea environment and the pipeline, more particularly the dry annulus in the pipeline. This increases the integrity of the connector arrangement of the present invention.

Additionally, the or each dry barrier chamber preferably comprises a wet mateable penetrator at each subsea environment end. That is, through the end of dry barrier chamber outside the outer housing and extending into the subsea environment. According to another embodiment of the present invention, one or more of the dry barrier chambers comprise pressure balanced conduits. This helps with the pressure change between the subsea environment and the pressure within the dry interior housing, preferably being at or below atmospheric pressure. Whilst such conduits may be oil-filled pressure balanced, such barrier chambers are still 'dry' in the sense of providing a barrier against water entry into the connector arrangement from the subsea environment, i.e. the high-pressure water of the surrounding sea.

The conduits can provide the relevant connecting or conducting path between penetrators between each end of the dry barrier chamber.

Optionally, the connector arrangement of the present invention further comprises a subsea environment stab plate having one or more wet mateable connectors. Such a stab plate may be separate from the connector housing, but is preferably associated, more preferably directly or indirectly connected to or otherwise conjoined with the connector arrangement.

The subsea environment stab plate provides a convenient interface or port for a subsea umbilical providing power, etc. in particular the subsea umbilical termination, to which it could be directly attached. The stab plate then comprises one or more wet mateable connectors, preferably flying leads, between each wet mateable connector of the stab plate and each dry barrier chamber. Flying leads are known in the art, and can be easily replaced if the lead fails due to repeated connections. This also minimizes work required to install and/or repair connections between a subsea umbilical termination and the connector arrangement, generally by an ROV (remotely operated vehicle), in use.

The outer housing could have any suitable size, shape or design. Optionally, the outer housing is adapted to receive the outer pipe of the pipeline The outer housing may be weldable thereto, and the outer housing could form an annular chamber around the part of the pipeline therewithin. Optionally, the outer housing is adapted to radially extend from the outer pipe of the. The outer housing may be weldable and could also form a chamber protruding from the pipeline therewithin Potentially, the outer housing is wholly or substantially cylindrical, elliptical or barrel shaped. Preferably, the outer housing comprises one or more end walls and an intermediate wall, and the welded dry barrier chamber(s) are arranged through one or both of the end walls.

Whilst the end walls, could have any size, shape or design, they are generally wholly or substantially flat. The dry barrier chambers can be arranged in a suitable pattern, optionally circular but not limited thereto, around and through one or more of the end walls.

It is a particular advantage of the present invention that the dry barrier chamber(s) can be provided as separate devices or units, and the outer housing, such as the end wall of the outer housing, can be easily adapted to accommodate the number of dry barrier chambers required.

In one embodiment of the present invention, suitable apertures or holes can be formed in a end wall during its manufacture, including prior to its inclusion with other pieces to form the housing of the connector arrangement, through which the dry barrier chambers can then simply be inserted and subsequently welded therewith using a well-controlled welding process, especially onshore.

in an alternative embodiment, one or more of the dry barrier chamber(s) comprises internal and external parts welded separately to the outer housing. Optionally, the outer housing is at least formed from an end wall comprising a number of apertures formed prior to forming the outer housing, and at least one dry barrier chamber is formed of internal and external parts welded in line to each side of an aperture to form a dry barrier chamber.

The internal part could be lined up first, tack welded and complete weld is deposited. In a second time, the operation is repeated with the external part of the dry chamber satisfying various potential temperature limitations of mateable penetrators or connector conduits.

The order in which such dry barrier chambers are welded to one or other end wall is driven by dry chambers pattern and arrangement.

Upon welding, suitable non destructive testing can be performed to ensure a correct connection with the outer housing end wall(s). Such testing can be easily carried out onshore. A testing phase is clearly highly desirable and may be critical to ensure the integrity of the barrier arrangement.

The welding of the dry barrier chambers forms the first 'barrier' or 'transition' provided by the present invention between the sea or wet environment, and the dry interior housing. This is the primary leak path. Inside the connectors, the use of elastomeric seals can provide a 'dual barrier' arrangement, to prevent a leak path through the connector. This is a secondary leak path. Mitigating both primary and secondary leak paths for the connector arrangement of the present invention provides a 'dual' dry chamber or dual dry barrier arrangement against any damage to the pipeline by any leakage from the sea.

One preferred embodiment of the present invention is a connector arrangement comprising;

at least one electrical, trace heating, optical or umbilical dry barrier chamber;

the outer housing being barrel shaped with two end walls, the dry barrier chambers being arranged radially around and through one or more of the end walls, and being welded to the end wall(s);

all the dry barrier chambers are pressure balanced conduits, and having a mateable penetrator at each end of the dry chamber, with the subsea environment end penetrator being a wet mateable penetrator;

and leads (at least one electrical cold lead and one optical lead tail) between each dry interior housing end mateable penetrator and each PIP cable.

Another preferred embodiment of the present invention is a connector arrangement comprising;

at least one electrical, trace heating, optical or umbilical dry barrier chamber the outer housing being cylindrical shaped with one end wall protruding from the outerpipe, the dry barrier chamber(s) being arranged transversally and through the end wall, and being welded to the end wall;

wherein all the dry barrier chambers are pressure balanced conduits, and all the dry barrier chambers having a mateable penetrator at each end of the dry barrier chamber, with a subsea environment end penetrator being a wet mateable penetrator;

and leads (at least one electrical cold lead and one optical lead tail) between each dry interior housing end mateable penetrator and each cable.

In a further aspect of the present invention, there is provided a pipeline as defined herein comprising one or more connector arrangements as herein described.

Optionally, the pipeline is a pipe-in-pipe (PIP) pipeline for use in a subsea environment, such a PIP pipeline as defined herein, i.e. comprising at least inner and outer pipes having an annular space therebetween, and one or more PIP cables extending along the annular space.

Alternatively, the pipeline is a bundle pipeline having an outer casing pipe and a combination of inner pipes as described herein.

Advantageously, the housing of a connector arrangement of the pipeline is welded to the outer pipe to form a sealed chamber between the inside of the outer housing and the outside of the outer pipe.

Preferably, the connector arrangement is provided at an end portion of the pipeline, e.g. a pipeline end termination (PLET) portion. It will be appreciated that in a continuous pipeline, one or more PLET portions may be present along the pipeline. It will also be appreciated that the connector arrangement may be provided at a mid-line position within the pipeline, e.g. at an in-line tee location.

Generally, a pipeline is formed of a number of pipeline stalks or sections, commonly but not limited to each having inner and outer pipeline sections of the same or similar length. The nature and dimensions and other parameters of the inner and outer pipeline sections can differ, generally due to the differing purposes, as is well known in the art.

Subsea pipelines, formed from multiple sections, can be relatively short, such as under 1 km long, or can be up to several kilometres or longer.

Preferably, the pipeline is reelable or towable. Optionally, the pipeline can be installed by any pipelay method, known by the skilled man.

Preferably, the pipeline and the connector arrangement are assembled above sea, preferably onshore or on a vessel.

The present invention also provides a method of laying a pipeline, the pipeline comprising at least inner and outer pipes having an annulus therebetween, and one or more cables extending along the annular space, the pipeline being assembled with a connector arrangement as described herein, comprising at least the steps of:

a) providing a pipeline assembled with a connector arrangement as described herein;
b) installing the pipeline in a marine environment; and
c) connecting the connector arrangement to a subsea umbilical termination arrangement (SUTA) of a power umbilical.

BRIEF DESCRIPTION OF THE DRAWINGS

Embodiments of the present invention will now be described by way of example only and with reference to the accompanying drawings in which:

FIG. 5a is perspective of a side wall of a housing and second dry barrier chambers being connected therewith for FIG. 4a;

FIGS. 6a and 7a are schematic perspective and partially cutaway views of respectively of two second dry barrier chambers, one for electrical connection and one for optical connection, of FIG. 5a;

FIG. 10 shows a view of a bundle pipeline.

DESCRIPTION OF PREFERRED EMBODIMENTS

Figure 1:
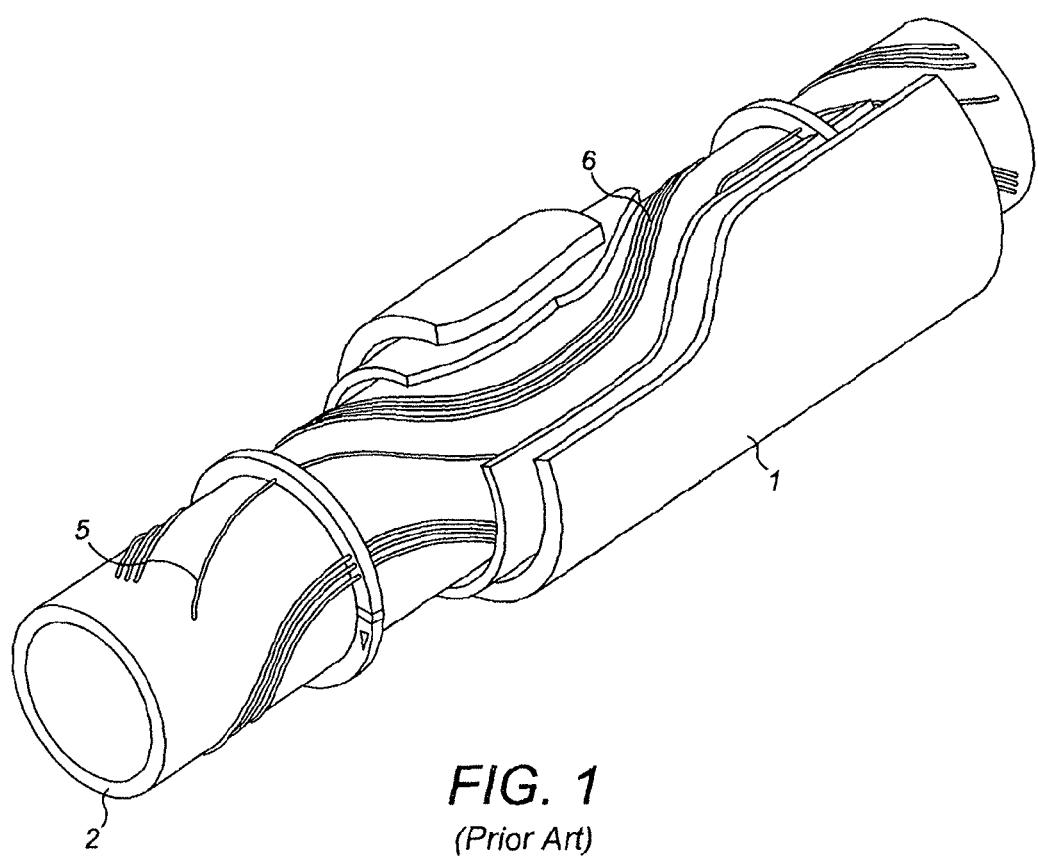
FIG. 1 is a perspective view of a length of a prior art PIP pipeline.

Referring to the drawings, FIG. 1 has been previously described.

Figure 2:
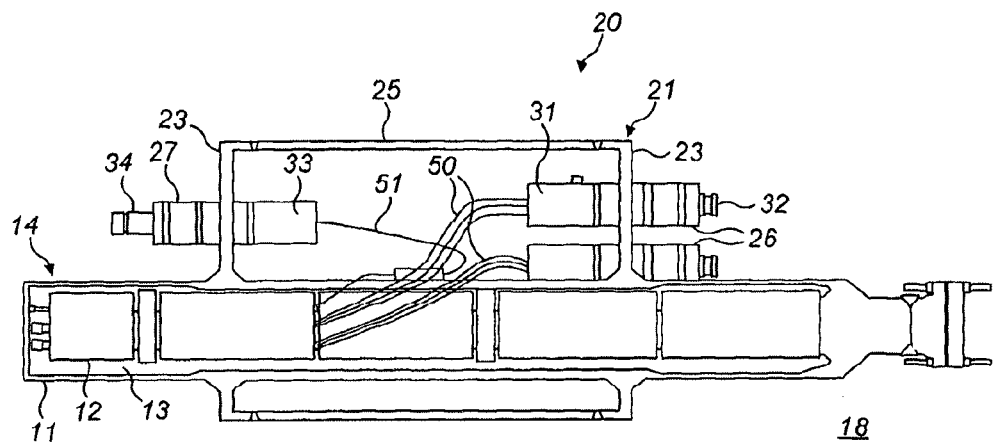
FIG. 2 is a schematic side cross section of a first connector arrangement of the present invention assembled with a PIP pipeline.

FIG. 2 shows a first connector arrangement 20 of the present invention. The connector arrangement 20 is designed for use in conjunction with a pipe-in-pipe (PIP) pipeline 14 for laying and use in a subsea environment 18. Such a PIP pipeline 14 can comprise at least one inner pipe 12 and one outer pipe 11, having an annular space 13 thereinbetween, and one or more cables (not shown in FIG. 2) extending along the outside of the inner pipe(s) 12. Most typically, the cables include electrical cables for trace heating the fluid inside the inner pipe 12 and optical cables for collecting various data, e.g. temperature. It will however be appreciated that the invention is not limited to the use with electrical or optical cables only but is applicable to any cable to be inserted within the annulus of a PIP or bundle pipeline.

The first connector arrangement 20 comprises a generally cylindrical outer housing 21 having a surrounding or intermediate wall 25 and a pair of end walls 23 which face in an axial direction along the PIP pipeline 14. In use, the outer housing 21 is joined, preferably by welding, to the outer pipe 11 of the PIP pipeline 14. When so joined to the outer pipe 11, the outer housing 21 can surround the outer pipe 11 to define an annular dry interior housing 22 between the exterior of the outer pipe 11 and the outer housing 21. The dry interior housing 22 is configured to remain at atmospheric pressure in use.

The end walls 23 have PIP pipeline apertures (discussed in more detail below with respect to FIGS. 5 and 5a) adapted to receive the outer pipe 11 therethrough before the outer housing 21 is sealingly connected with the outer pipe 11.

Figure 5:
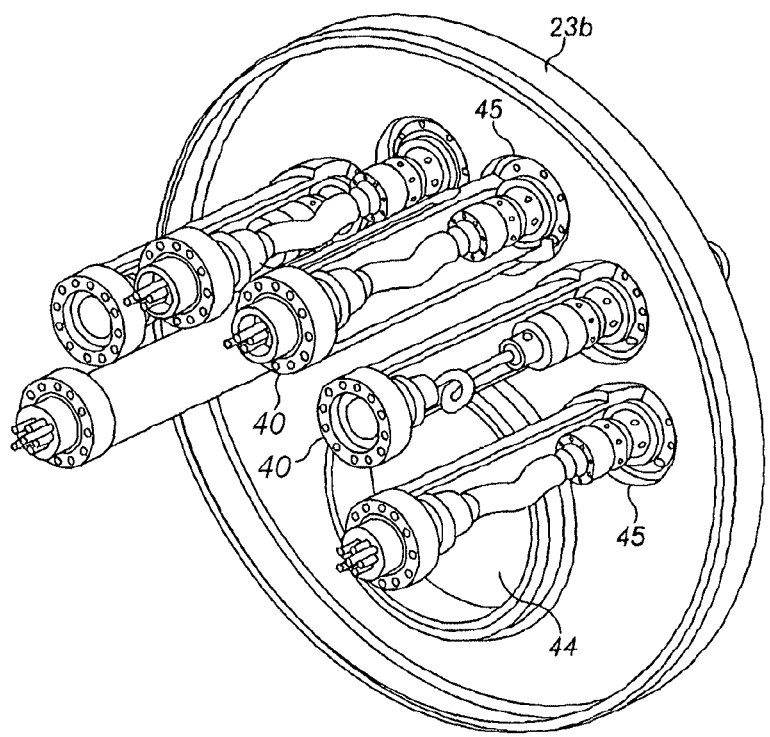
FIG. 5 is a schematic perspective of a side wall of a housing and first dry barrier chambers being connected therewith for FIG. 4.
Figure 5A:
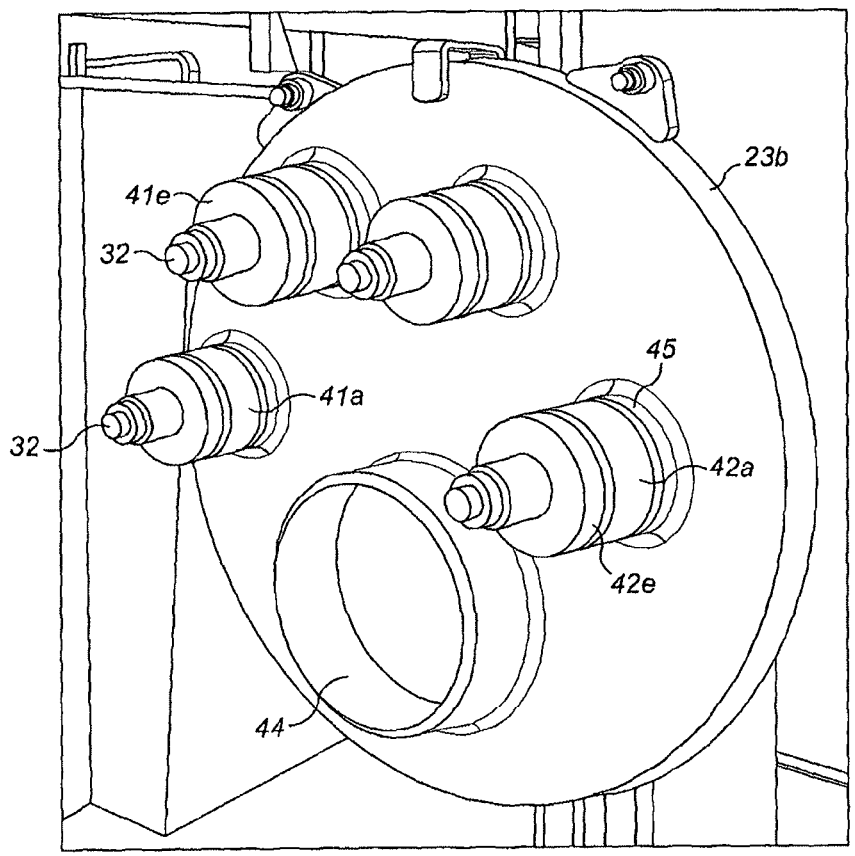

The end walls 23 are also adapted to sealingly receive or have located thereon first and second dry barrier chambers 26, 27 (dry barrier chambers 40) therethrough, as also discussed in more detail with respect to FIGS. 5 and 5a. The first dry barrier chambers 26 are for electrical connection, and the second dry barrier chambers 27 are for optical connection. The dry barrier chambers 40 are welded to the outer housing 21, thereby simultaneously achieving a rigid fit and a reliably tested and robust sealed connection with the outer housing 21.

Each dry barrier chamber 40 has respective first internal or dry mateable penetrators 31, 33 at each dry interior housing end, and second wet mateable penetrators 32, 34 at each subsea environment end. The first and second penetrators 31-34 have connectors at each end for the relevant electrical or optical conduit through the penetrators 31-34.

The first dry penetrators 31, 33 are fed through the ends of the dry barrier chambers 40 so that one connector 31b, 33b (see FIGS. 6 and 7) is positioned in the dry barrier chamber 40, and another connector 31a, 33a is positioned in the dry interior housing 22 of the outer housing 21. The second wet penetrators 32, 34 are fed through the other ends of the dry barrier chambers 40 so that associated connectors 32a, 34a (see FIGS. 6 and 7) are positioned in the dry barrier chambers 40, and other connectors 32b, 34b are positioned outside the outer housing 21 and in the subsea environment 18.

The number of dry barrier chambers 40 provided is as required depending on the required number of connections, and any required level of redundancy, possibly provided by one or more dummy barrier chambers.

Cold lead cables 50 and fibre optic tails 51 respectively connect the connectors 31a, 33a at the ends of the dry penetrators 31 and 33 with the electrical cables and optical cables on the PIP pipeline 14 through one or more holes (not shown in FIG. 2) in the outer pipe 11.

The connectors 32a, 34a of the second penetrators 32, 34 inside the dry barrier chamber 40 are dry-mateable connectors, whereas the connectors 32b, 34b of the second penetrator 32, 34 outside the housing 21 are wet-mateable connectors.

The connectors at the opposite ends of the first dry penetrators 31, 33, i.e. inside the outer housing 21 and in the dry interior housing 22, are dry-mateable connectors.

The first and second dry barrier chambers are mounted on the outer housing 21 and through the end walls 23 so as to extend parallel with or axially with the longitudinal axis of a PIP pipeline 14. The outer housing 21 also comprises a longitudinal axis which is parallel to the longitudinal axis of a PIP pipeline 14 when the outer housing 21 is mounted on the outer pipe 11 and, accordingly, the dry barrier chambers 40 are also parallel to the longitudinal axis of the outer housing 21.

The dry barrier chambers 40 are also arranged in the side walls 23 of the outer housing 21 radially with respect to the longitudinal axis of the housing 21, thereby minimizing the space occupied by the connector arrangement 20 adjacent the PIP pipeline 14.

Figure 3:
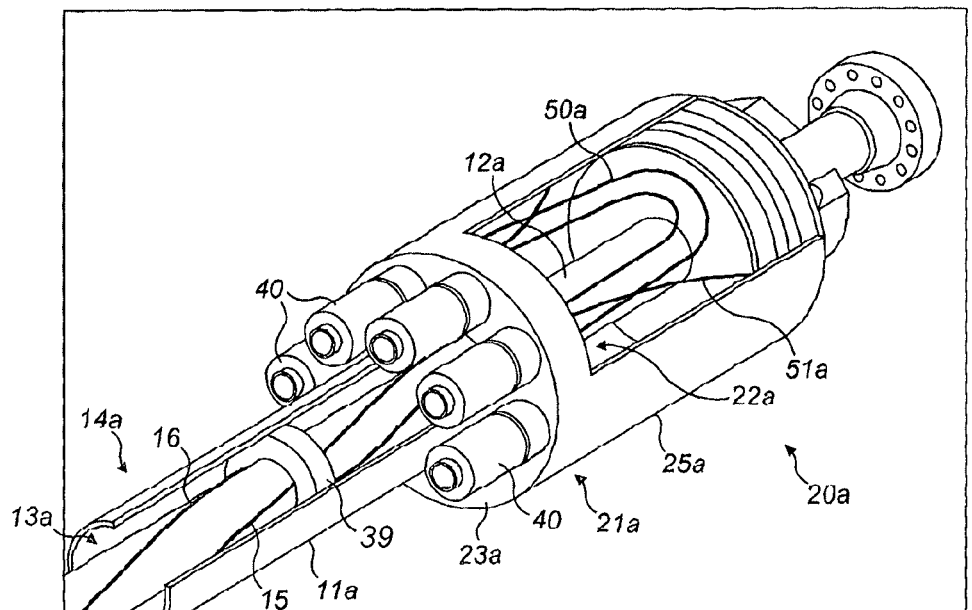
FIG. 3 is a schematic perspective partially cutaway view of a second connector arrangement.

FIG. 3 shows a second connector arrangement 20a of the present invention. The connector arrangement 20a is designed for use in conjunction with a pipe-in-pipe (PIP) pipeline 14a for a subsea environment. Such a PIP pipeline 14a can comprise an inner pipe 12a and an outer pipe 11a, having an annular space 13a therein between, and one or more electrical cables 15 extending along the outside of the inner pipe 12a for trace heating the fluid inside the inner pipe 12a, and an optical cable 16 for collecting various data, e.g. temperature.

The second connector arrangement 20a again comprises a generally cylindrical outer housing 21a having a surrounding wall 25a and a pair of end walls 23a which face in an axial direction parallel with the PIP pipeline 14a. The outer housing 21a defines an annular dry interior housing 22a between the inner pipe 12a and the outer housing 21a.

The end walls 23a of the housing 21a are adapted to sealingly receive a desired number of third dry barrier chambers 40 therethrough, one or more for electrical connection, and one or more for optical connection. The dry barrier chambers 40 are welded to the outer housing 21a, thereby simultaneously achieving a rigid fit and a reliably tested and robust sealed connection with the outer housing 21a.

Cold lead cables 50a and fibre optic tails 51a connect penetrators (not shown) at the dry interior housing ends of the third barrier chambers 40 with the electrical cables 15 and optical cable 16.

A support collar 39 is located between the inner pipe 12a and the outer pipe 11a to provide spacing therebetween, and optionally to form a waterstop along the annular space 13a, thereby forming a dry interior in conjunction with the dry interior housing 22a.

Figure 3A:
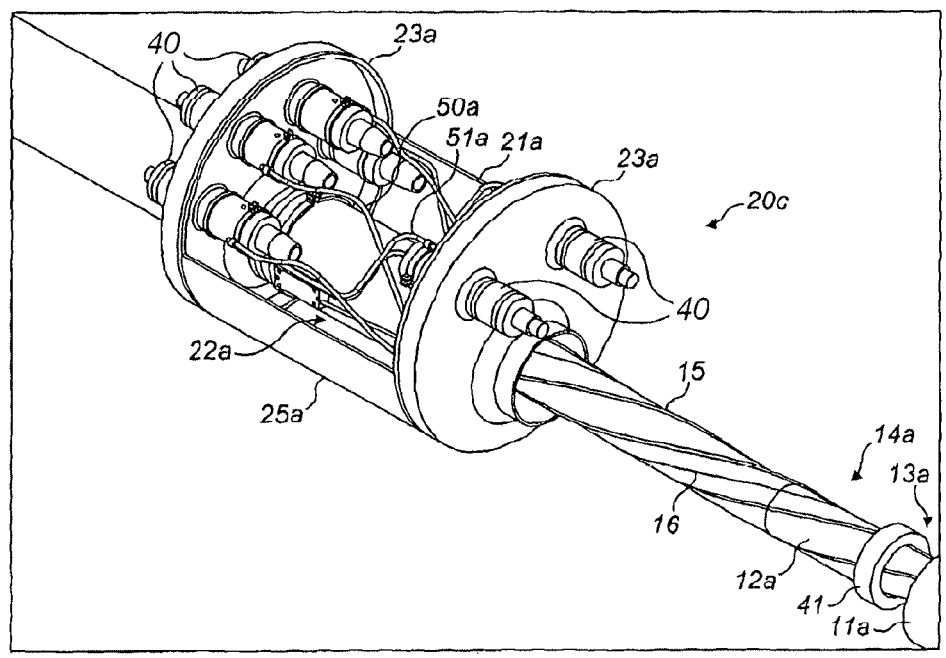
FIG. 3a is a schematic perspective partially cutaway view of a third connector arrangement variation.

FIG. 3a shows a third connector arrangement 20c being very similar to the second connector arrangement 20a shown in FIG. 3, with dry barrier chambers 40 now extending through each end wall 23a.

Figure 4:
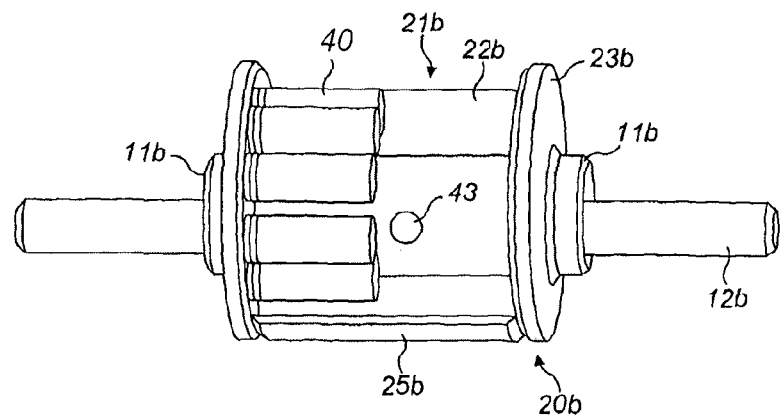
FIG. 4 is a schematic perspective partially cutaway view of a fourth connector arrangement.

FIG. 4 show another connector arrangement 20b of the present invention. The connector arrangement 20b is designed for use in conjunction with a pipe-in-pipe (PIP) pipeline for laying in a subsea environment, having an inner pipe 12b and an outer pipe 11b, an annular space therebetween, and one or more electrical cables extending along the outside of the inner pipe 12b, and an optical cables.

The connector arrangement 20b comprises a barrel or cylindrical outer housing 21b having a surrounding wall 25b (not shown on the Figure) and a pair of end walls 23b. The outer housing 21b defines an annular dry interior housing 22b between the outer pipe 11b within the connector arrangement 20b, and the outer housing 21b.

The end walls 23b are adapted to sealingly receive fourth and fifth dry barrier chambers 40 therethrough, one or more for electrical connection 41, and one or more for optical connection 42. The dry barrier chambers 40 are welded to the housing 21b, thereby simultaneously achieving a rigid fit and a reliably tested and robust sealed connection with the outer housing 21b as better shown in FIG. 5.

FIG. 4 also shows a suitable aperture 43 through which leads or connectors from the dry barrier chambers 40 can be passed through the outer pipe 11b to connect to the electrical and optical cables on the inner pipe 12b.

Figure 4A:
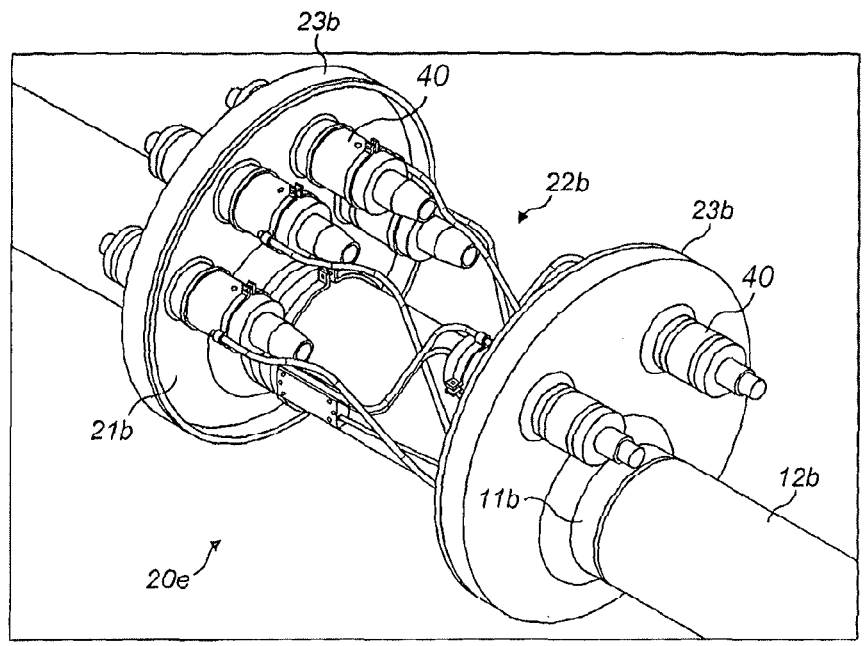
FIG. 4a is a schematic perspective partially cutaway view of another connector arrangement.

FIG. 4a shows a yet further connector arrangement 20e being very similar to the connector arrangement 20c shown in FIG. 3a, with dry barrier chambers 40 now extending through each end wall 23a, and formed by welding dry barrier chamber parts on each side of each end wall 23a as discussed in more detail in relation to FIGS. 5a, 6a and 7a.

FIG. 5 shows assembly of an end wall 23b of the connector arrangement 20b. One aperture 44 is formed in the end wall 23b for passage of the outer pipe 11b (not shown) of the PIP pipeline therethrough for securement.

Other apertures 45 are formed, preferably in a radial and curved manner between the outer pipe aperture 44 and the edge of the end wall 23b. The fourth and fifth dry barrier chambers 40 can be inserted in the other apertures 45 so that one end of the fourth and fifth dry barrier chambers 40 is positioned outside the outer housing 21b (once formed), and the other end is positioned at the exterior of the outer pipe 11b but within the dry interior housing 22b of the outer housing 21b. The fourth and fifth dry barrier chambers can then be welded to the end wall 23b. The outer housing 21b can be welded to the outer pipe 11b prior to or after the welding of the fourth and fifth dry barrier chambers 40, to form the annular chamber 22b.

FIG. 5a shows assembly of an end wall 23b of the connector arrangement 20c or 20e. Again, one aperture 44 is formed in the end wall 23b for passage of the outer pipe 11b (not shown) of the PIP pipeline therethrough for securement.

Other apertures 45 are formed, preferably in a radial and curved manner between the outer pipe aperture 44 and the edge of the end wall 23b. Each dry barrier chamber, 40 is formed of two parts, one internal part 41d, 42d and one external part 41e, 42e, shown in more detail in FIGS. 6a and 7a. FIG. 5a shows the external parts 41e, 42e welded to the outer wall 23b on one side of the apertures 45, with wet mateable penetrators 32 extending therefrom, and such welds are easily testable prior to use to ensure a rigid fit and leak-prevention.

Figure 6:
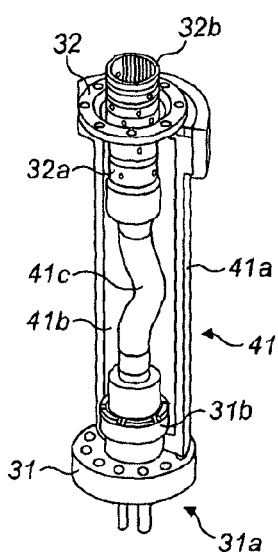
FIGS. 6 and 7 are schematic perspective and partially cutaway views of respectively of two first dry barrier chambers, one for electrical connection and one for optical connection, of FIG. 5.
Figure 7:
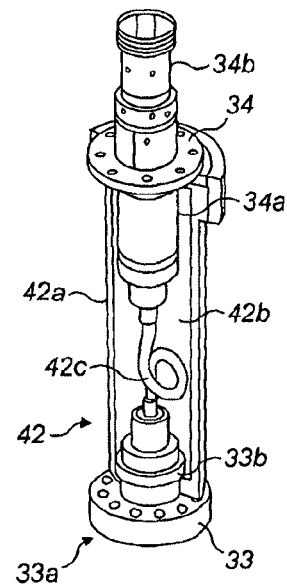

As shown in FIGS. 6 and 7, the fourth and fifth dry barrier chambers 40 shown in FIG. 5, selected by way of example only, each comprise a penetrator housing 41a, 42a defining an inner dry chamber 41b, 42b and containing a conduit 41c, 42c. Each dry barrier chamber 40 has respective first dry mateable penetrators 31, 33 at each dry interior housing end, and second wet mateable penetrators 32, 34 at each subsea environment end. The first and second penetrators 31-34 have connectors 31-34a, b at each end for the relevant electrical or optical conduit through the penetrators 31-34.

In FIGS. 6a and 7a, each dry barrier chamber 40 is made of two parts: one internal (41d, 42d) and one external (41e and 42e). Each part is welded separately on each side of the housing end wall 23b (shown in part) to complete the provision of the dry barrier chambers 40.

FIG. 6a also shows an example of an elastomeric seal 46 that could be added within the dry barrier chamber 40 behind the connector 31b to provide a secondary leak path to prevent a leak path through the dry barrier chamber itself, and so to constitute a 'dual barrier' effect to prevent any water ingress from the sea. Other elastomeric seals could be added to other connectors to increase this effect.

The pressure balanced conduits 41c, 42c house connectors that connect the end connectors 31b, 33b, 32a, 34a of the dry barrier chambers 40 inside the otherwise dry chambers 40.

Figure 9:
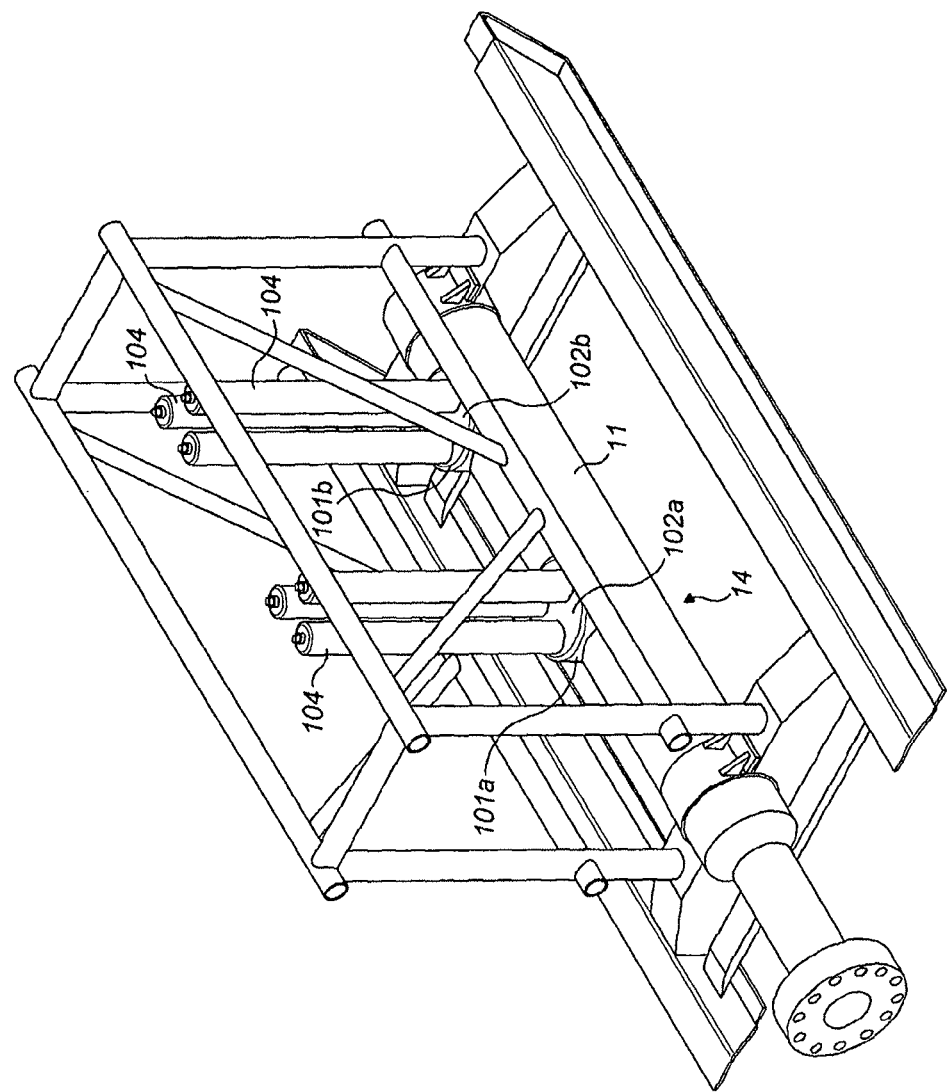
FIG. 9 is a schematic perspective of another connector arrangement.

FIG. 9 shows another connector arrangement 100 of the present invention. The connector arrangement 100 is designed for use in conjunction with a pipe-in-pipe (PIP)

pipeline 14 for laying and use in a subsea environment 18. Such a PIP pipeline 14 can comprise at least one inner pipe 12 and one outer pipe 11 with one annular space 13 thereinbetween, and one or more cables extending along the outside of the inner pipe(s) 12 (inner pipe 12, annular space 13 and cables not shown in FIG. 9). The cables may include electrical cables for trace heating the fluid inside the inner pipe 12, optical cables for collecting various data, e.g. temperature, electrical power cables for supplying power to remote systems as well as umbilical cables for various purposes.

The connector arrangement 100 comprises an elongate outer housing with two generally cylindrical upstanding housings 101a, b having each end wall 102a, b which face in an radial direction along the PIP pipeline 14. In use, the outer housing is welded to the outer pipe 11 of the PIP pipeline 14 or constitutes a forged pipeline component welded to the PIP pipeline 14. When so joined to the outer pipe 11, the outer housing defines a protruding dry interior housing (not shown on the figure) between the outer pipe 11 and the outer housing. The dry interior housing is configured to remain at atmospheric pressure in use or below i.e. vacuum.

The upstanding ends walls 102a, b are adapted to sealingly receive (or have welded on each side) first and second dry barrier chambers 104 therethrough. The dry barrier chambers 104 are therefore welded to the housing, thereby simultaneously achieving a rigid fit and a reliably tested and robust sealed connection with the housing.

The connector arrangements shown in the figures can be provided at an end portion of the pipeline, e.g. a pipeline end termination (PLET) portion. It will be appreciated that in a continuous pipeline one or more PLET portions may be present along the pipeline. Location at ILT/ITA is also applicable to this arrangement.

The assembly of the pipeline and the connector arrangements can be performed onshore or on a vessel.

Figure 8:
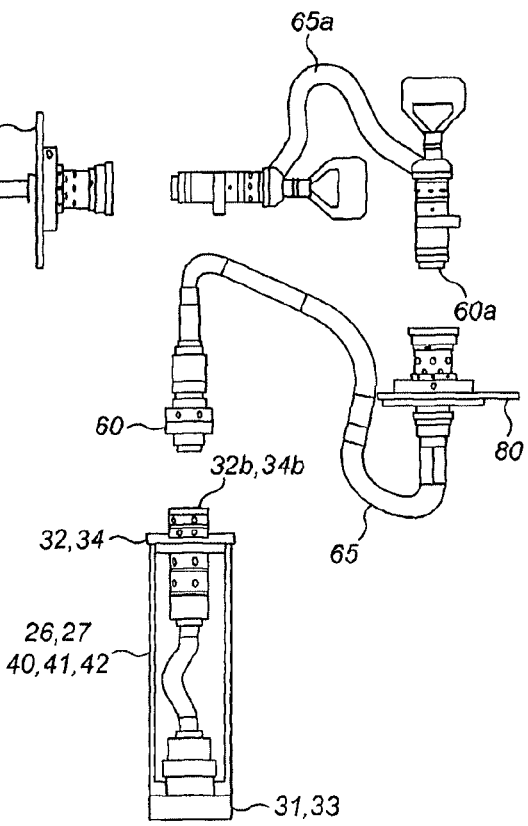
FIG. 8 is a schematic illustration of a connection between a dry barrier chamber of any of FIGS. 2-7a and a subsea umbilical termination arrangement (SUTA) of a power umbilical.

In practice, a pipeline assembled with a connector arrangement is installed in a marine environment; and the connector arrangement is connected to a subsea umbilical termination arrangement (SUTA) of a subsea umbilical. In order to connect the SUTA, typically, as illustrated in FIG. 8, the wet-mateable connectors 32b, 34b of the dry barrier chambers 26, 27, 40 (only one shown) are first connected to a stab plate 80 via a series of further wet-mateable connectors 60 (one shown) and flying leads 65 (one shown). On the other side of the stab plate 80, a further series of wet mateable connectors 60a and flying leads 65a lead to the SUTA 90.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A barrier connector arrangement for a multi-pipe pipeline for use in a subsea environment, the pipeline comprising an inner pipe and an outer pipe around the inner pipe to define a dry annulus between the inner pipe and the outer pipe, and at least one cable extending along the annulus, the connector arrangement comprising:
    an outer housing configured to be joined to the outer pipe to define a dry interior around the outer pipe in communication with the annulus; and
    at least one dry barrier chamber with a dry interior, the at least one dry barrier chamber extending partially through the outer housing, and having one end located inside of the outer housing, another, opposite end located outside of the outer housing and a portion surrounding the dry interior of the at least one dry barrier chamber, located between the one end and the another end and welded to the outer housing, the at least one dry barrier chamber being configured to receive at least one wet mateable penetrator at the another end thereof to keep the interior of the at least one dry barrier chamber dry and to connect the at least one cable in the pipeline with at least one external cable in the subsea environment.

2. The connector arrangement as claimed in claim 1, wherein the at least one cable comprises at least one cable from the group consisting of electrical cable, trace heating cable, optical cable and umbilical cable, and wherein the at least one cable extends in parallel with the inner pipe of the pipeline.

3. The connector arrangement as claimed in claim 1, wherein the pipeline is a pipe-in-pipe (PIP) pipeline having an annular space as the annulus between the inner and outer pipes, and the at least one cable comprises at least one PIP cable.

4. The connector arrangement as claimed in claim 1, wherein the pipeline is a bundle pipeline having a casing pipe as the outer pipe and a combination of inner pipes comprising at least one fluid flowline.

5. The connector arrangement as claimed in claim 1, wherein the at least one dry barrier chamber includes one or more elastomeric seals therewithin.

6. The connector arrangement as claimed in claim 1, wherein the dry interior is configured to maintain a pressure selected from the group consisting of an atmospheric pressure, a reduced pressure, a compensated pressure, and a vacuum.

7. The connector arrangement as claimed in claim 1, wherein the at least one dry barrier chamber comprises an internal mateable penetrator at the one end, and a wet mateable penetrator at the another end.

8. The connector arrangement as claimed claim 1, wherein the at least one dry barrier chamber comprises internal and external parts, each internal and external part welded separately to the outer housing.

9. The connector arrangement as claimed in claim 1, wherein the at least one dry barrier chamber comprises a pressure balanced conduit.

10. The connector arrangement as claimed in claim 1, further comprising a subsea environment stab plate having one or more wet mateable connectors.

11. The connector arrangement as claimed in claim 10, comprising a flying lead between a wet mateable connector of the stab plate and the at least one dry barrier chamber.

12. The connector arrangement as claimed in claim 1, wherein the outer housing comprises one or more end walls and an intermediate wall, and wherein the at least one dry barrier chamber extends through an end wall.

13. The connector arrangement as claimed in claim 1, wherein the outer housing includes an end wall comprising at least one aperture, formed prior to forming the outer housing, through which the at least one dry barrier chamber is insertable.

14. The connector arrangement as claimed in claim 1, wherein the outer housing includes an end wall comprising at least one aperture formed prior to forming the outer housing, and the at least one barrier chamber is formed of internal and external parts welded in line to each side of the at least one aperture to form a dry barrier chamber.

15. The connector arrangement as claimed in claim 1, wherein the at least one dry barrier chamber is one of a plurality of dry barrier chambers, wherein the connector includes the plurality of dry barrier chambers, and
- wherein the dry barrier chambers include
  - at least two electrical heating dry barrier chambers and
  - at least one optical dry barrier chambers; wherein
  - the outer housing is barrel-shaped with two end walls and an intermediate wall, the barrier chambers are dry barrier chambers, each dry barrier chamber is arranged radially around and partially through a respective end wall, and is welded to the respective end wall; and wherein
- all the dry barrier chambers comprise pressure balanced conduits, and all the dry barrier chambers have a wet mateable penetrator at each subsea environment end, and an internal mateable penetrator at each dry interior housing end within the outer housing; and
- further comprising leads between each internal mateable penetrator and each cable.

16. A multi-pipe pipeline as defined in claim 1 comprising one or more connector arrangements as claimed in claim 1.

17. The pipeline as claimed in claim 16 being a PIP (pipe-in-pipe) pipeline.

18. The pipeline as claimed in claim 16 being a bundle pipeline.

19. The connector arrangement as claimed in claim 15, wherein the dry barrier chambers include four electrical heating dry barrier chambers and two optical dry barrier chambers.

* * * * *